United States Patent
Kim et al.

(10) Patent No.: US 11,738,375 B2
(45) Date of Patent: Aug. 29, 2023

(54) APPARATUS AND METHOD FOR CLEANING EDGE DIRECTOR

(71) Applicant: CORNING INCORPORATED, Corning, NY (US)

(72) Inventors: Jeehun Kim, Anyang-si (KR); Myeonghwan Lee, Cheonan-si (KR); Kyubyung Oh, Suwon-si (KR)

(73) Assignee: Corning Incorporated, Corning, NY (US)

( * ) Notice: Subject to any disclaimer, the term of this patent is extended or adjusted under 35 U.S.C. 154(b) by 939 days.

(21) Appl. No.: 16/489,498

(22) PCT Filed: Feb. 23, 2018

(86) PCT No.: PCT/US2018/019318
§ 371 (c)(1),
(2) Date: Aug. 28, 2019

(87) PCT Pub. No.: WO2018/160443
PCT Pub. Date: Sep. 7, 2018

(65) Prior Publication Data
US 2020/0001332 A1 Jan. 2, 2020

(30) Foreign Application Priority Data
Feb. 28, 2017 (KR) .................. 10-2017-0026553

(51) Int. Cl.
*B08B 7/00* (2006.01)
*B05B 13/02* (2006.01)
*C03B 17/06* (2006.01)

(52) U.S. Cl.
CPC ........ *B08B 7/0071* (2013.01); *B05B 13/0278* (2013.01); *C03B 17/064* (2013.01)

(58) Field of Classification Search
CPC .. B08B 7/0071; B05B 13/0278; C03B 17/064
See application file for complete search history.

(56) References Cited

U.S. PATENT DOCUMENTS 1,673,907 A 6/1928 Ferngren
1,810,921 A 6/1931 Mambourg
(Continued)

FOREIGN PATENT DOCUMENTS

CN 1867520 A 11/2006
CN 101817632 A 9/2010
(Continued)

OTHER PUBLICATIONS

Japanese Patent Application No. 2019-546833, Decision to Grant a Patent dated Jan. 5, 2022, 5 pages (2 pages of English Translation and 3 pages of Original Copy); Japanese Patent Office.
(Continued)

*Primary Examiner* — Binh X Tran
(74) *Attorney, Agent, or Firm* — Matthew J. Mason

(57) ABSTRACT

The present disclosure relates to an apparatus and method for cleaning an edge director, and more particularly, to an edge director cleaning apparatus that includes two or more nozzle pipes arranged to be parallel to each other, nozzle tips respectively provided at first ends of the two or more nozzle pipes, fuel manifolds respectively connected to second ends of the two or more nozzle pipes, and a fixing guide configured to fix the nozzle pipes, wherein the nozzle tips extend in an oblique direction with respect to an extending direction of the nozzle pipes. When the apparatus and method for cleaning an edge director according to the present disclosure are used, devit can be safely removed without damage to the apparatus while reducing downtime.

20 Claims, 18 Drawing Sheets

(56) References Cited

U.S. PATENT DOCUMENTS

| | | | |
|---|---|---|---|
| 3,451,798 A | 6/1969 | Simon | |
| 3,502,456 A * | 3/1970 | Fetner | C03C 25/002 |
| | | | 65/157 |
| 3,537,834 A | 11/1970 | Simon | |
| 4,125,425 A | 11/1978 | Brissot | |
| 4,525,194 A | 6/1985 | Rudoi | |
| 7,409,839 B2 | 8/2008 | Boratav et al. | |
| 8,176,753 B2 | 5/2012 | Kahlout et al. | |
| 2003/0110804 A1 | 6/2003 | Fenn et al. | |
| 2005/0138966 A1 | 6/2005 | Pitbladdo | |
| 2010/0212360 A1 | 8/2010 | Delia et al. | |
| 2011/0100057 A1 | 5/2011 | Gaylo | |
| 2011/0297754 A1 * | 12/2011 | Valdez | B05B 7/2467 |
| | | | 239/379 |
| 2014/0216107 A1 | 8/2014 | Brunello et al. | |
| 2015/0329401 A1 * | 11/2015 | Chung | C03B 17/064 |
| | | | 65/195 |

FOREIGN PATENT DOCUMENTS

| | | |
|---|---|---|
| CN | 102112379 A | 6/2011 |
| CN | 104379516 A | 2/2015 |
| CN | 105026325 A | 11/2015 |
| DE | 10229344 B4 | 2/2011 |
| JP | 52-017844 B1 | 5/1977 |
| JP | 55-136137 A | 10/1980 |
| JP | 05-030886 A | 2/1993 |
| JP | 03384274 B2 | 3/2003 |
| JP | 2010-195677 A | 9/2010 |
| JP | 2013230963 A | 11/2013 |
| JP | 2015-502908 A | 1/2015 |
| JP | 2016-501816 A | 1/2016 |
| JP | 2016-505499 A | 2/2016 |
| KR | 10-2011-0091685 A | 8/2011 |
| KR | 10-1224666 B1 | 1/2013 |
| KR | 2014105801 A | 9/2014 |
| KR | 10-2015-0090846 A | 8/2015 |
| KR | 10-2017-0007395 A | 1/2017 |
| TW | 201100337 A | 1/2011 |
| TW | 201332906 A | 8/2013 |
| TW | I447078 B | 8/2014 |
| TW | 201612119 A | 4/2016 |
| WO | 2010099278 A2 | 9/2010 |
| WO | 2013/082360 A1 | 6/2013 |
| WO | WO-2013082360 A1 * | 6/2013 ........... C03B 17/064 |

OTHER PUBLICATIONS

Chinese Patent Application No. 201880014596.7, Office Action dated Jul. 1, 2021, 11 pages (4 pages of English Translation and 7 pages of Original Document), Chinese Patent Office.

International Search Report and Written Opinion of the International Searching Authority; PCT/US2018/019318; dated Jun. 11, 2018; 16 Pages; Korean Intellectual Property Office.

Taiwanese Patent Application No. 107106475, Office Action dated Jul. 13, 2021, 3 page (English Translation Only); Taiwanese Patent Office.

\* cited by examiner

APPARATUS AND METHOD FOR CLEANING EDGE DIRECTOR

BACKGROUND

This application claims the benefit of priority under 35 U.S.C. 371 of International Application No. PCT/US2018/019318, filed on Feb. 23, 2018, which claims the benefit of priority under 35 U.S.C. § 119 of Korean Patent Application Serial No. 10-2017-0026553 filed on Feb. 28, 2017, the content of each are relied upon and incorporated herein by reference in their entirety.

Field

One or more embodiments relate to an apparatus and method for cleaning an edge director, and more particularly, to an apparatus and method for cleaning an edge director capable of safely removing devit without damage to the apparatus while reducing downtime.

Description of the Related Art

In a fusion drawing machine (FDM) among flat glass manufacturing facilities, an edge director configured to guide a flow of molten glass influences size and flatness of flat glass being manufactured. As a flat glass manufacturing process progresses, devitrified crystallized glass, commonly referred to as devit, may continuously grow on a surface of an edge director. Because such devit interferes with fusion that occurs near an edge of a root of a forming wedgen FDM, it may provide a cause of various linked problems.

SUMMARY

According to one or more embodiments, an edge director cleaning apparatus includes two or more nozzle pipes arranged to be parallel to each other, nozzle tips respectively provided at one ends of the two or more nozzle pipes, fuel manifolds respectively connected to the other ends of the two or more nozzle pipes, and a fixing guide configured to fix the nozzle pipes, wherein the nozzle tips are aimed in an oblique direction with respect to an extending direction of the nozzle pipes.

According to one or more embodiments, an angle of about 60° to about 75° may be formed between the direction that the nozzle tips are aimed in and the extending direction of the nozzle pipes.

According to one or more embodiments, at least one of the nozzle pipes may be configured to be rotatable with respect to a central axis thereof.

According to one or more embodiments, the nozzle pipe may be configured to be rotatable by about 3° to about 15° with respect to the central axis thereof.

According to one or more embodiments, the edge director cleaning apparatus may further include a cooling apparatus configured to at least partially surround the two or more nozzle pipes.

According to one or more embodiments, the number of the nozzle pipes may be four. A first nozzle pipe and a second nozzle pipe that are next to each other may form a first nozzle group, and a third nozzle pipe and a fourth nozzle pipe that are next to each other may form a second nozzle group. The first nozzle group and the second nozzle group may be configured to be mirror-symmetrically operable to each other.

According to one or more embodiments, the second nozzle pipe may be next to the third nozzle pipe, and the first nozzle pipe and the second nozzle pipe may be configured to be rotatable so that a direction that a nozzle tip of the first nozzle pipe is aimed in intersects a direction that a nozzle tip of the second nozzle pipe is aimed in.

According to one or more embodiments, an edge director cleaning method includes making an edge director cleaning apparatus approach an edge director of a forming apparatusfusion drawing machine (FDM) having the edge director, and heating and removing devitrified glass attached to the edge director by using the edge director cleaning apparatus, wherein the making of the edge director cleaning apparatus approach the edge director includes making the edge director cleaning apparatus approach the edge director by moving nozzle pipes thereof in a longitudinal direction of the forming apparatusFDM, and rotating at least one of the nozzle pipes about a central axis thereof to aim the edge director.

According to one or more embodiments, the edge director cleaning method may further include, before the heating and removing of the devitrified glass, tilting the forming apparatusFDM with respect to a tilting axis in a direction perpendicular to a plane of glass being drawn from the forming apparatusFDM.

According to one or more embodiments, the forming apparatusFDM may be tilted about 0.1° to about 0.5° with respect to the tilting axis.

According to one or more embodiments, molten glass may continuously overflow from both sides of the forming apparatusFDM while the forming apparatusFDM is being tilted.

According to one or more embodiments, the heating and removing of the devitrified glass may be performed by an edge director at an opposite side of an edge director which is at a lower position due to the tilting of the forming apparatusFDM.

According to one or more embodiments, the edge director cleaning method may further include, before the tilting of the forming apparatusFDM, decreasing a volumetric flow rate of molten glass by about 5% to about 20%.

According to one or more embodiments, the edge director cleaning apparatus may be arranged to be a substitute for an edge roller.

According to one or more embodiments, the edge director cleaning apparatus may include four nozzle pipes arranged to be parallel to each other, four nozzle tips respectively provided at one ends of the four nozzle pipes, fuel manifolds respectively connected to the other ends of the four nozzle pipes, and a fixing guide configured to fix the nozzle pipes. The four nozzle pipes may be a first nozzle pipe, a second nozzle pipe next to the first nozzle pipe, a third nozzle pipe next to the second nozzle pipe, and a fourth nozzle pipe next to the third nozzle pipe. The four nozzle tips may be a first nozzle tip, a second nozzle tip next to the first nozzle tip, a third nozzle tip next to the second nozzle tip, and a fourth nozzle tip next to the third nozzle tip. The heating and removing of the devitrified glass may include heating the devitrified glass using the first nozzle pipe and the fourth nozzle pipe.

According to one or more embodiments, when the first nozzle pipe heats the devitrified glass, the second nozzle tip may be configured to guide molten glass to prevent the molten glass from falling directly on the first nozzle tip. When the fourth nozzle tip heats the devitrified glass, the third nozzle tip may be configured to guide molten glass to prevent the molten glass from falling directly on the fourth nozzle tip.

According to one or more embodiments, fuel gas and oxygen supplied to the fuel manifolds may be supplied at a molar ratio of about 1:1.5 to about 1:2.5.

According to one or more embodiments, the edge director cleaning method may further include moving the first to fourth nozzle pipes in the longitudinal direction of the forming apparatusFDM to heat and remove devitrified glass at another portion of the edge director.

According to one or more embodiments, the edge director cleaning method may further include rotating the first to fourth nozzle pipes with respect to central axes thereof to heat and remove devitrified glass at another portion of the edge director.

According to one or more embodiments, an edge director cleaning method for cleaning an edge director of a forming apparatusfusion drawing machine (FDM) including an edge director having a first surface and a second surface includes heating and removing devitrified glass on the first surface using a first nozzle pipe and a second nozzle pipe arranged to be parallel to each other, and heating and removing devitrified glass on the second surface after changing positions of the first nozzle pipe and the second nozzle pipe and changing directions that a first nozzle tip and a second nozzle tip respectively provided at ends of the first nozzle pipe and the second nozzle pipe are aimed in, wherein, in the heating and removing of the devitrified glass on the second surface, the first nozzle tip is adjusted to heat the devitrified glass, and the second nozzle tip is adjusted to guide molten glass to prevent the molten glass from falling directly on the first nozzle tip.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
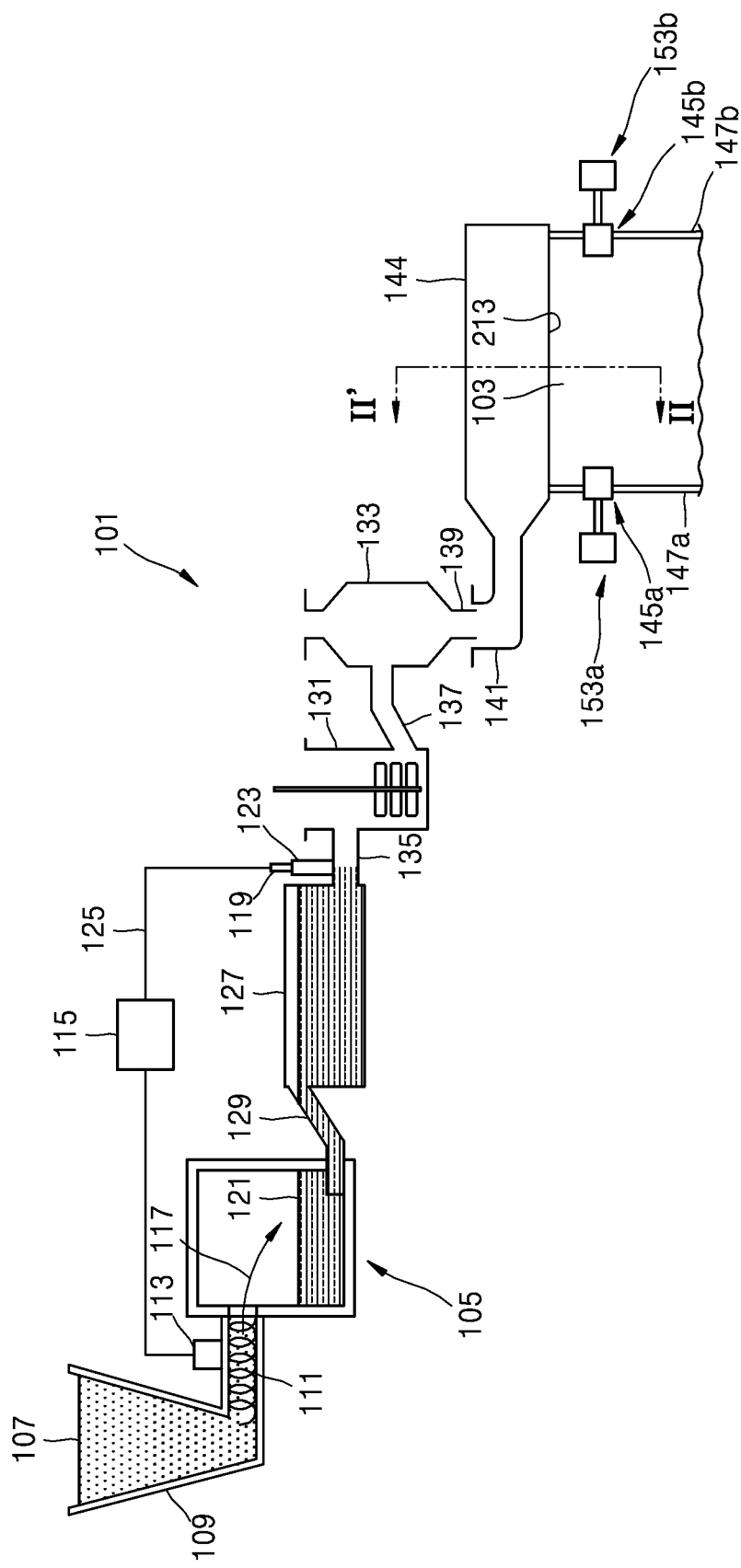
FIG. 1 is a conceptual view illustrating a glass product manufacturing apparatus according to an embodiment of the present disclosure.

The disclosure will now be described more fully with reference to the accompanying drawings, in which exemplary embodiments are shown. The subject matter of the disclosure may, however, be embodied in many different forms and should not be construed as being limited to the exemplary embodiments set forth herein; rather, these embodiments are provided so that this disclosure will be thorough and complete, and will fully convey the subject matter to those skilled in the art. In the drawings, the thicknesses of layers and regions may be exaggerated for clarity. Wherever possible, like reference numerals in the drawings will denote like parts. Therefore, the disclosure is not limited by relative sizes or intervals as shown in the accompanied drawings.

While such terms as "first," "second," etc., may be used to describe various components, such components are not limited to the above terms. The above terms are used only to distinguish one component from another. For example, a first component may indicate a second component or a second component may indicate a first component without conflicting.

The terms used herein in various exemplary embodiments are used to describe exemplary embodiments only, and should not be construed to limit the various additional embodiments. Singular expressions, unless defined otherwise in contexts, include plural expressions. The terms "comprises" or "may comprise" used herein in various exemplary embodiments may indicate the presence of a corresponding function, operation, or component and do not limit one or more additional functions, operations, or components. It will be further understood that the terms "comprises" and/or "comprising," when used in this specification, may be used to specify the presence of stated features, integers, steps, operations, elements, and/or components, but do not preclude the presence or addition of one or more other features, integers, steps, operations, elements, components, and/or groups thereof.

When a certain embodiment may be implemented differently, a specific process order may be performed differently from the described order. For example, two consecutively described processes may be performed substantially at the same time or performed in an order opposite to the described order.

Variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing. As used herein, the term "and/or" includes any and all combinations of one or more of the associated listed items. In addition, in this specification, "substrate" may denote the substrate itself, or a stacked structure including the substrate and a one or more coatings, layers or films formed on a surface of the substrate. Also, in the present specification, "a surface of a substrate" may denote an exposed surface of the substrate, or an external surface of a coating, layer or film formed on the substrate.

FIG. 1 illustrates a schematic view of an exemplary glass product manufacturing apparatus 101 according to an embodiment.

Referring to FIG. 1, the glass product manufacturing apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A glass levelmetal probe 119 can be used to measure a glass melt 121 level within a standpipe 123 and communicate the measured information to the controller 115 by way of a communication line 125.

The glass product manufacturing apparatus 101 can also include a fining vessel 127, such as a fining tube, located downstream from the melting vessel 105 and coupled to the melting vessel 105 by way of a first connecting tube 129. A mixing vessel 131 such as a stir chamber, can also be located downstream from the fining vessel 127 and a delivery vessel 133, such as a bowl, may be located downstream from the stirring vessel 131. As shown, a second connecting tube 135 can couple the fining vessel 127 to the stirring vessel 131 and a third connecting tube 137 can couple the stirring vessel 131 to the delivery vessel 133. As further illustrated, an exit conduit 139 can be positioned to deliver glass melt 121 from the delivery vessel 133 to an inlet 141 of a forming vessel 1443. As shown, the melting vessel 105, fining vessel 127, the mixing vessel 131, delivery vessel 133, and forming vessel 1443 are examples of glass melt stations that may be located in series along the glass product manufacturing apparatus 101.

The melting vessel 105 is typically made from a refractory material, such as refractory (e.g. ceramic) brick. The glass product manufacturing apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the exit conduit 139 and the inlet 141. The forming vessel 1443 is also made from a refractory material and is designed to form the glass ribbon 103.

Figure 2:
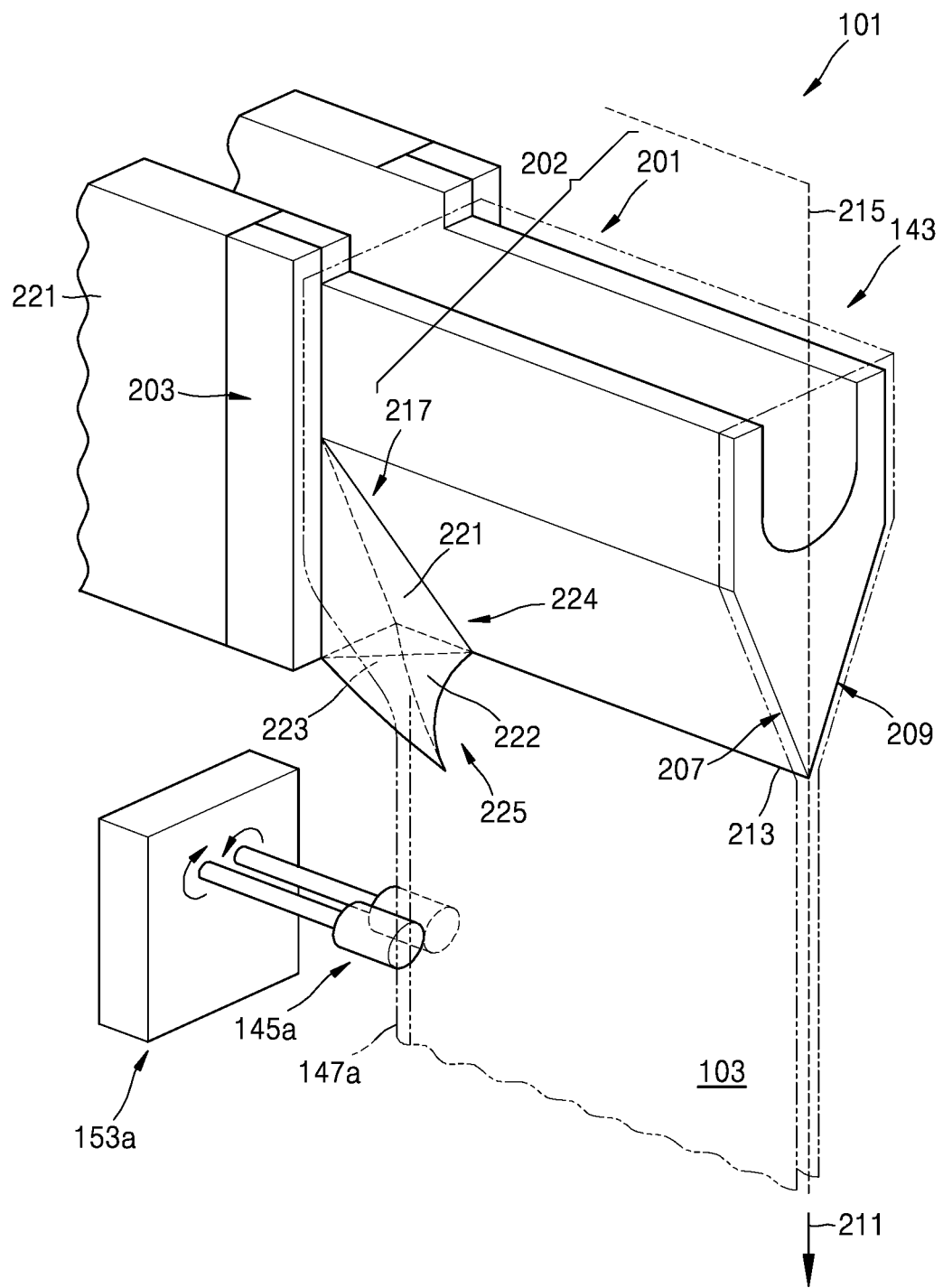
FIG. 2 is a cross-sectional perspective view of a fusion drawing machine (FDM) taken along line II-IF of FIG. 1.

FIG. 2 is a cross-sectional perspective view of the fusion drawing machine 143 along line II-II' of FIG. 1. As shown, the fusion drawing machine 143 includes a forming wedge 201 comprising a pair of downwardly inclined forming surface portions 207, 209 extending between opposed ends of the forming wedge 201. The pair of downwardly inclined forming surface portions 207, 209 converge along a downstream direction 211 to form a root 213. A draw plane 215 extends through the root 213 wherein the glass ribbon 103 may be drawn in the downstream direction 211 along the draw plane 215. As shown, the draw plane 215 can bisect the root 213 although the draw plane 215 may extend at other orientations with respect to the root 213.

The fusion drawing machine 143 may comprise one or more edge directors 217 intersecting with at least one of the pair of downwardly inclined forming surface portions 207, 209. In further examples, the one or more edge directors can intersect with both downwardly inclined forming surface portions 207, 209. In further examples, an edge director can be positioned at each of the opposed ends of the forming wedge 201 wherein an edge of the glass ribbon 103 is formed by molten glass flowing off the edge directors. The edge director 217 and the forming wedge 201 constitute a forming apparatus 202. For instance, as shown in FIG. 2, the edge director 217 can be positioned at a first opposed end 203 and a second identical edge director (not shown) can be positioned at a second opposed end (not shown). Each edge director can be configured to intersect with both of the downwardly inclined forming surface portions 207, 209. Each edge director 217 can be substantially identical to one another although the edge directors may have different characteristics in further examples. Various forming wedge and edge director configurations may be used in accordance with embodiments of the present disclosure. For example, embodiments of the present disclosure may be used with forming wedges and edge director configurations disclosed in U.S. Pat. Nos. 3,451,798, 3,537,834, 7,409,839 and/or U.S. Provisional Pat. Application No. 61/155,669, filed Feb. 26, 2009 that are each herein incorporated by reference in its entirety.

Referring to FIGS. 1 and 2, the fusion drawing machine 143 further comprises a first pair of edge rollers 145a configured to work a first edge bead 147a of a first edge portion 149a of the glass ribbon 103 drawn from the root 213 within a viscous zone of the glass ribbon 103. The first pair of edge rollers 145a can work the first edge bead 147a by pressing the edges of the molten glass flowing off of the inclined surface portions 207, 209 together to provide a well formed first edge bead 147a. Likewise, the fusion drawing machine 143 can further comprise a second pair of edge rollers 145b configured to work a second edge bead 147b of a second edge portion 149b of the glass ribbon 103. One or more motors 153a may be provided to rotate the first pair of edge rollers 145a. One or more motors 153b may be provided to rotate the second pair of edge rollers 145b.

Figure 3:
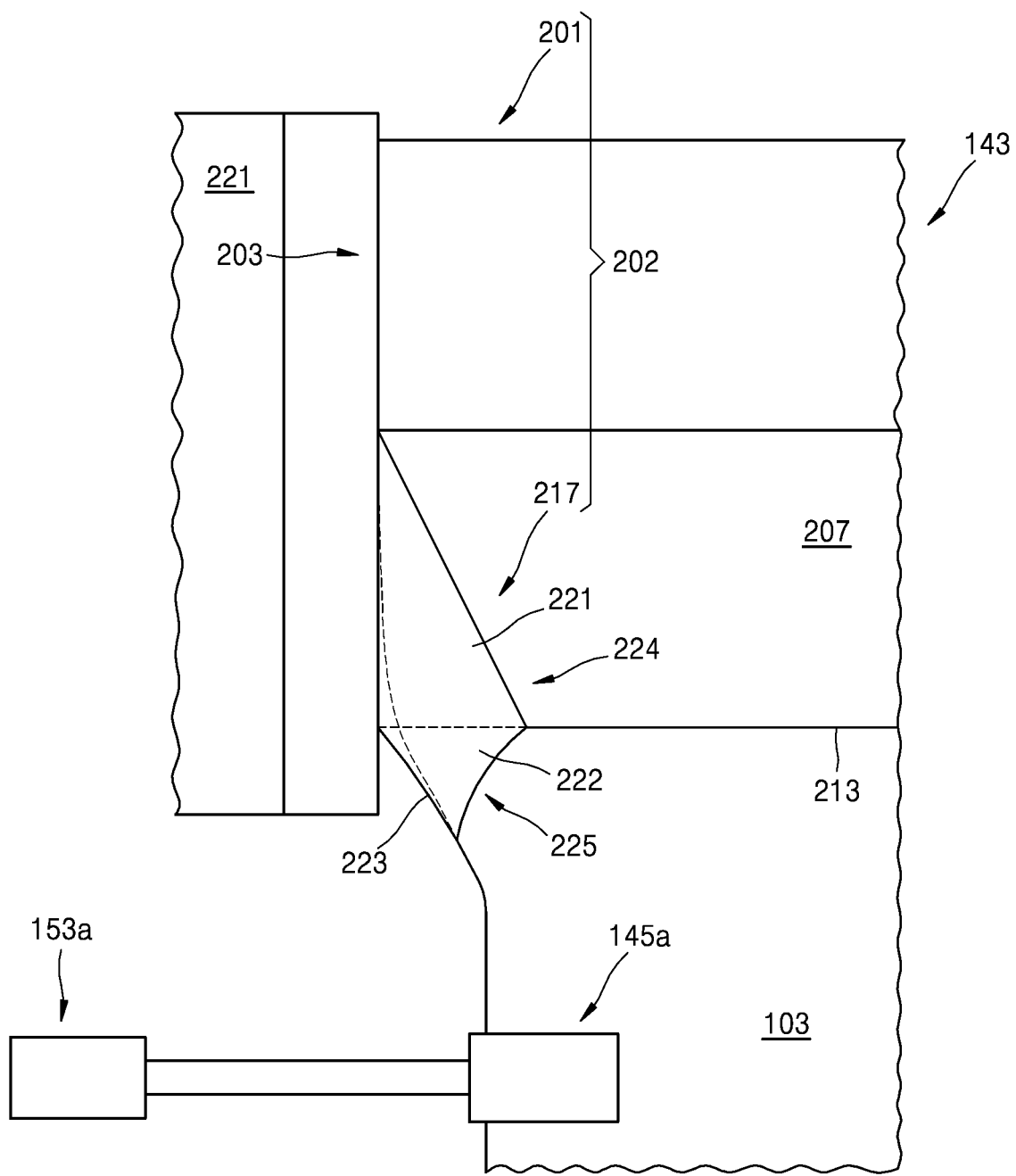
FIG. 3 is a front view of the forming apparatusFDM of FIG. 2 for describing an edge director in more detail.

FIG. 3 is a front view of the fusion drawing machine 143 of FIG. 2 to describe the edge director 217 in more detail.

Referring to FIG. 3, the edge director 217 may include a lower portion 225 and an upper portion 224. Although the upper portion 224 is illustrated as being present on the downwardly inclined forming surface portion 207 in FIG. 3, the upper portion 224 may be provided on each of the pair of downwardly inclined forming surface portions 207, 209. The upper portion 224 may be defined by the downwardly inclined forming surface portion 207, the first opposed end 203, and a first surface 221 of the edge director 217. The first surface 221 may be substantially planar, but may also be concave or have other surface features.

The lower portion 225 of the edge director 217 may include a second surface 222 and a third surface 223. The second surface 222 may extend from the first surface 221 and converge downstream of the draw plane 215 from the root 213. The second surface 222 may be curved or planar. The third surface 223 may be a plane extending in a lateral direction from an edge of the second surface 222.

An upper portion and a lower portion that are mirror-symmetric to the upper portion 224 and the lower portion 225 or have selectively different structures therefrom are also present on the forming surface portion 209 (see FIG. 2) at an opposite side of the forming surface portion 207 illustrated in FIG. 3. Particularly, the upper portion and/or the lower portion provided at the forming surface portion 209 may be integrally configured with or separately configured from the upper portion 224 and/or the lower portion 225 provided at the forming surface portion 207.

If portions of the molten glass drop below the liquidus temperature, crystallized glass may develop. Portions of crystallized glass, i.e., devitrification often referred to as devit within the molten glass, tend to accumulate at a rate proportional to the temperature difference below the glass liquidus temperature.

The devit interferes with fusion of the molten glass at an edge portion after the molten glass passes through the edge director and may be a cause of air pocket generation within the edge beads 147a, 147b during a forming process. Further, the devit significantly decrease controllability of a width of flat glass being formed and may be a cause of a product defect. Consequently, devit should be periodically removed from the edge director before the devit causes such problems.

Figure 4:
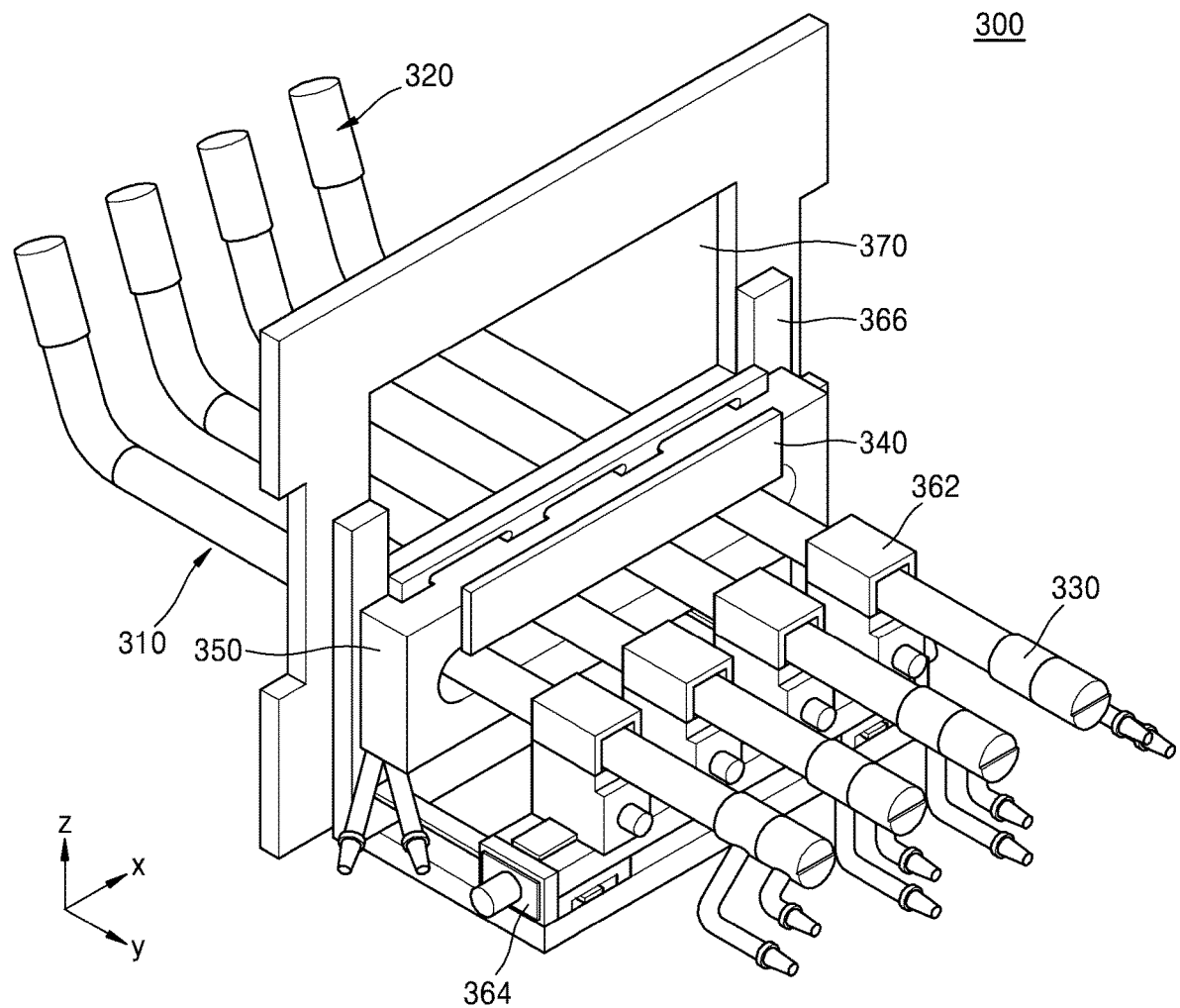
FIG. 4 illustrates an edge director cleaning apparatus according to an embodiment that may be used to remove devit.

FIG. 4 illustrates an edge director cleaning apparatus 300 according to an embodiment that may be used to remove devit.

Referring to FIG. 4, the edge director cleaning apparatus 300 according to embodiments includes two or more nozzle pipes 310 arranged parallel to each other and nozzle tips 320 provided at a first end of each of the nozzle pipes 310. Although a case in which four nozzle pipes 310 are present is illustrated in FIG. 4, the number of the nozzle pipes 310 may be less than four or greater than four. In some embodiments, the number of the nozzle pipes 310 may be an even number.

The nozzle tips 320 may be configured to serve as burners for burning fuel supplied through the nozzle pipes 310.

Accordingly, fuel manifold 330 may be provided at a second end of each of the nozzle pipes 310. Although an example in which the nozzle pipes 310 and fuel manifolds 330 are separated is given here, the nozzle pipes 310 and the fuel manifolds 330 may be integrally configured in some embodiments.

Each of the fuel manifolds 330 may be connected to a gas inlet port through which fuel gas is injected and an oxygen inlet port through which oxygen is injected. The fuel manifolds 330 may respectively connect the gas inlet ports to gas paths in the nozzle pipes 310. Also, the fuel manifolds 330 may respectively connect the oxygen inlet ports to oxygen paths in the nozzle pipes 310. The gas paths and the oxygen paths may be separated in the nozzle pipes 310. Fuel gas that has passed through the gas paths may be burned while being mixed with oxygen that has passed through the oxygen paths at the nozzle tips 320.

A molar ratio between the fuel gas supplied to the fuel manifolds 330 and oxygen may, for example, have a range of about 1:1.5 to about 1:2.5. The fuel gas may be, for example, a liquefied natural gas, but is not limited thereto.

The plurality of nozzle pipes 310 may be fixed by a fixing guide 340. In some embodiments, the fixing guide 340 may prevent relative positions of the nozzle pipes 310 from being changed or the nozzle pipes 310 from rotating due to vibration and the like generated during operations.

The edge director cleaning apparatus 300 described above may be arranged at upper portions or lower portions of the edge rollers 145a illustrated in FIG. 2 or at positions of the edge rollers 145a, for example, to be used to clean the edge director 217. When the edge director cleaning apparatus 300 is arranged at the positions of the edge rollers 145a, the edge rollers 145a may be removed, and then the edge director cleaning apparatus 300 may be arranged at the positions from which the edge rollers 145a are removed.

Here, directions of the nozzle tips 320 may be adjusted to target a surface of the edge director 217 to be cleaned. Also, the devit may be removed by being heated by flames released from the nozzle tips 320. The devit exhibits mobility when a temperature of the flames released from the nozzle tips 320 reaches 1250° C. or higher, and, when the temperature of the flames reaches 1300° C. or higher, the devit may begin to be removed from an end of the devit by an end thereof being melted when the temperature of the flames reaches 1300° C. or higher. Also, the devit may be smoothly removed by being melted when the temperature of the flames released from the nozzle tips 320 reaches 1350° C. or higher.

In some embodiments, the edge director cleaning apparatus 300 may further include an x-direction positioner 362, a y-direction positioner 364, and a z-direction positioner 366 each capable of moving the nozzle pipes 310 fixed by the fixing guide 340 in an x-direction, a y-direction, and a z-direction, respectively.

Figure 5A:
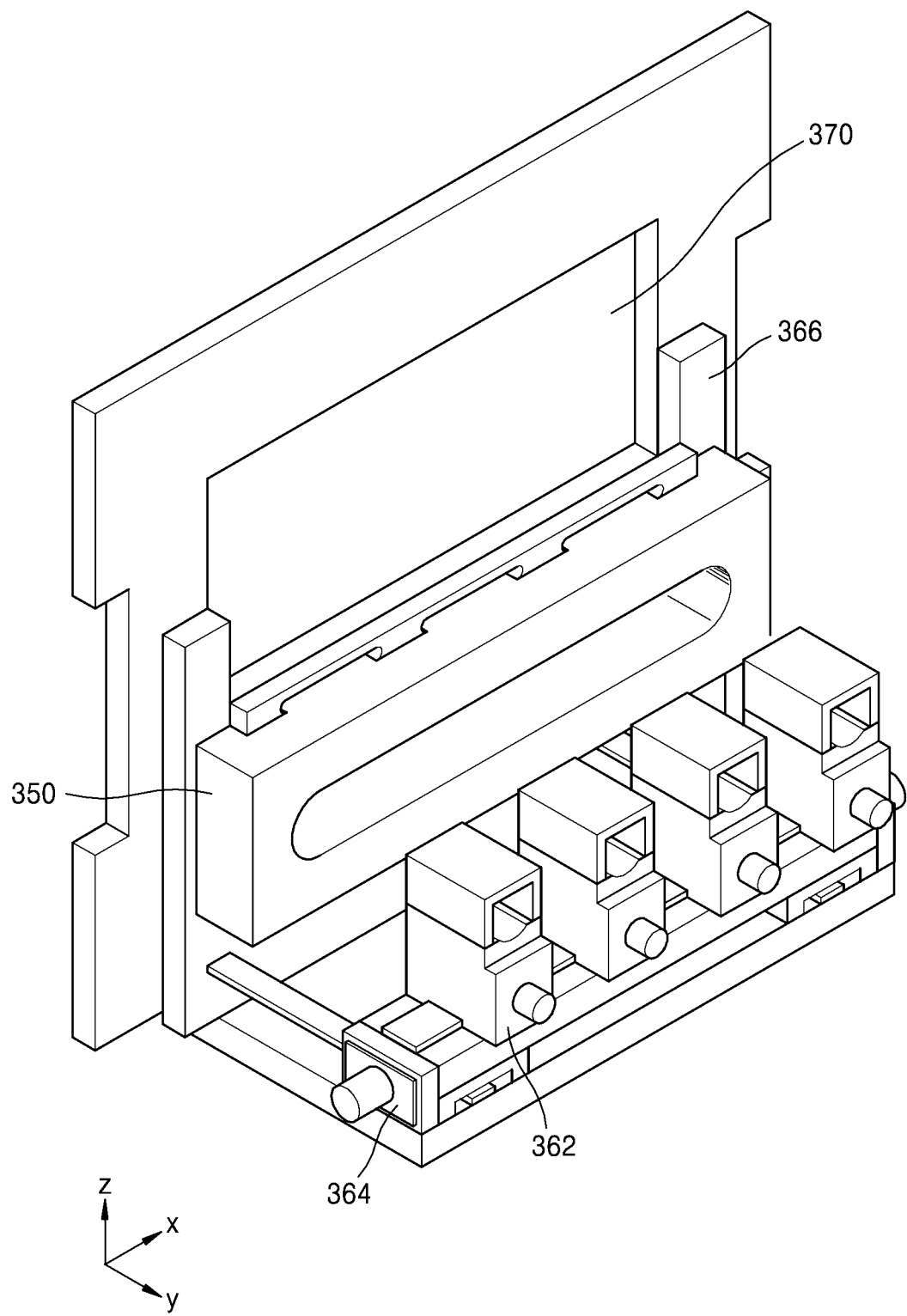
FIG. 5A is a perspective view illustrating a state in which an x-direction positioner, a y-direction positioner, and a z-direction positioner are coupled to one another.
Figure 5B:
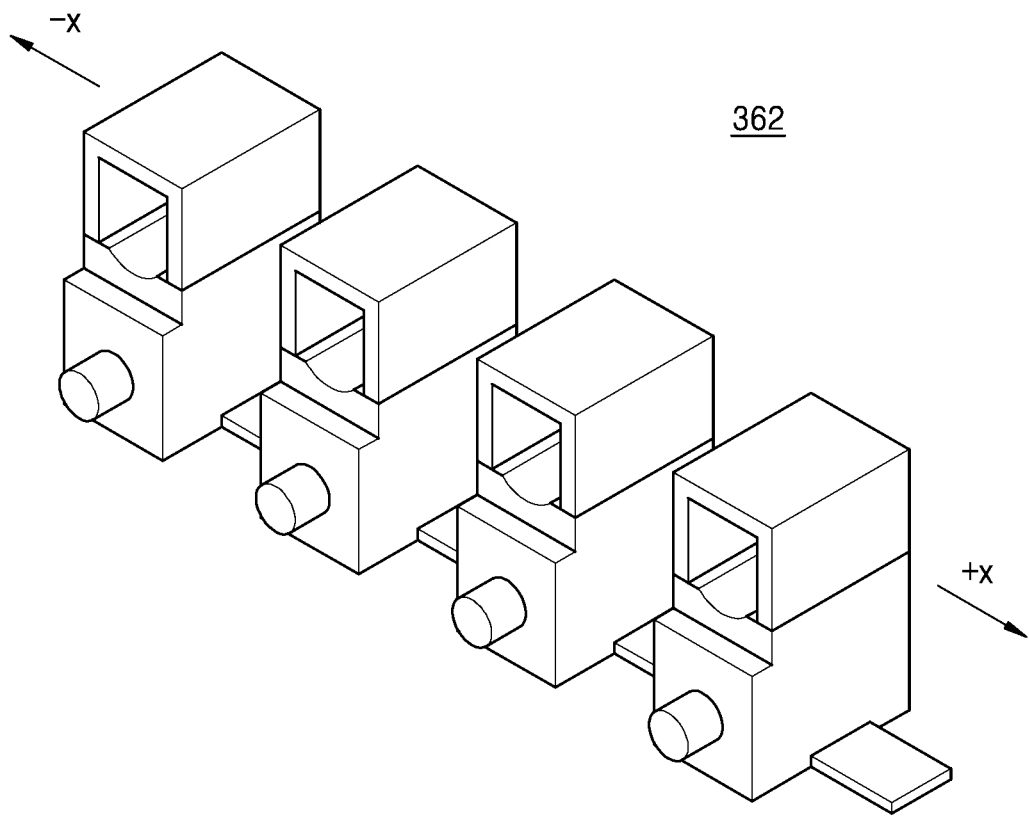
FIG. 5B is a perspective view illustrating a main part of the x-direction positioner.
Figure 5C:
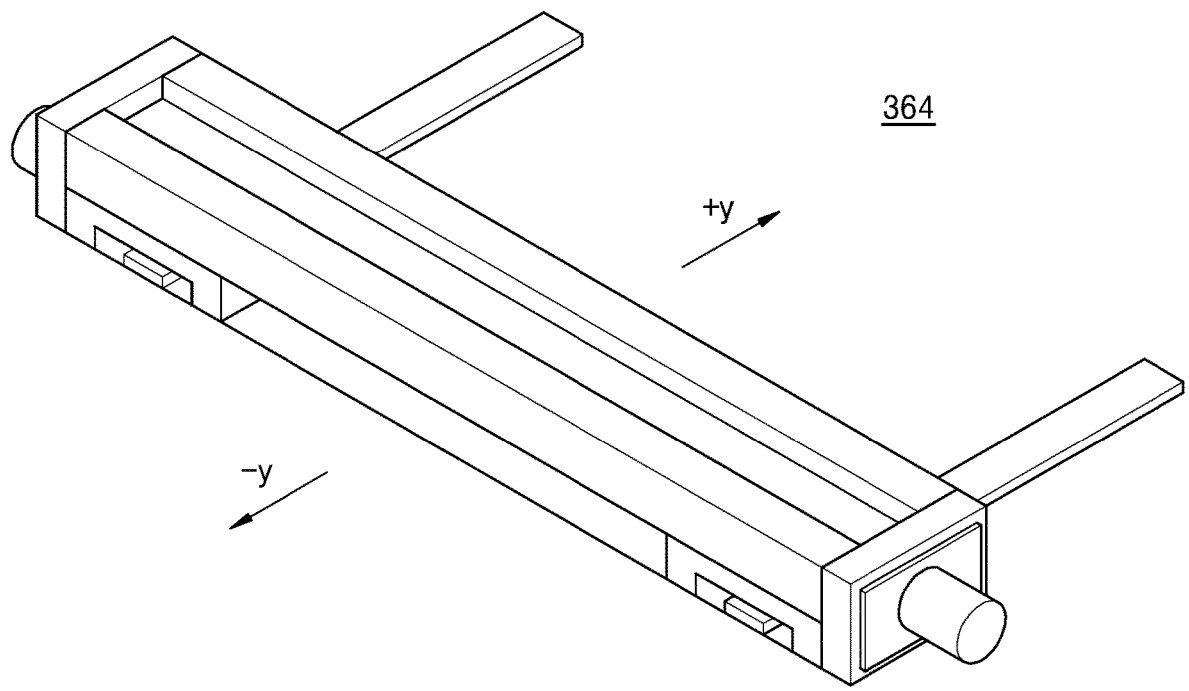
FIG. 5C is a perspective view illustrating a main part of the y-direction positioner.

FIG. 5A is a perspective view illustrating a state in which the x-direction positioner 362, the y-direction positioner 364, and the z-direction positioner 366 are coupled to one another. FIG. 5B is a perspective view illustrating a main part of the x-direction positioner 362. FIG. 5C is a perspective view illustrating a main part of the y-direction positioner 364. Referring to FIGS. 5A to 5C, the x-direction positioner 362, the y-direction positioner 364, and the z-direction positioner 366 may be configured to adjust x-direction, y-direction, and z-direction positions, respectively, of the nozzle pipes 310. The x-direction positioner 362, the y-direction positioner 364, and the z-direction positioner 366 may be easily implemented by a general technician using, e.g., a guide rail, a screwdriver, and the like. However, the present disclosure is not limited thereto.

Figure 6:
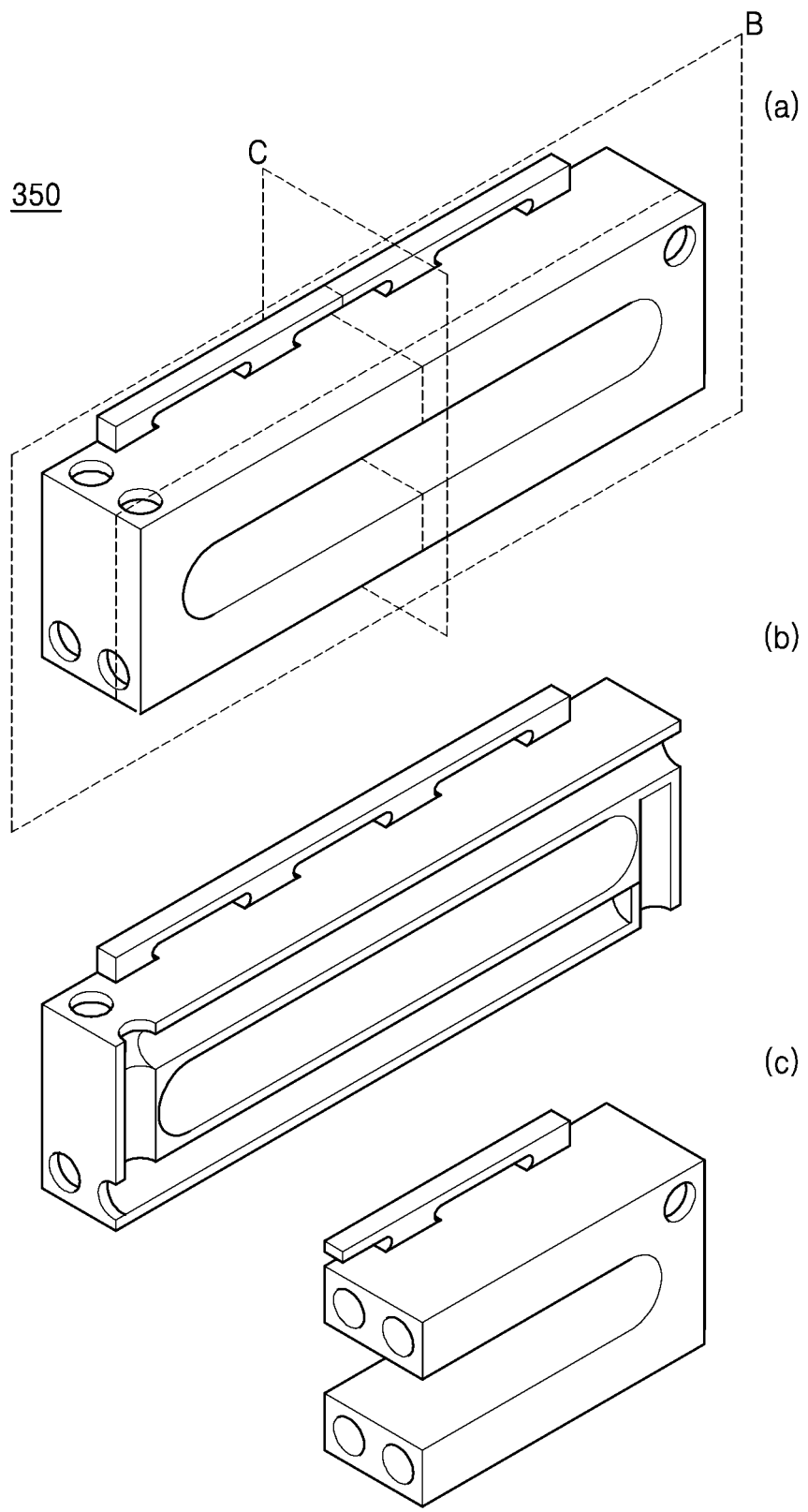
FIG. 6 illustrates a perspective view (a), a perspective view of a longitudinal cross-section (b), and a perspective view of a transverse cross-section (c) of a cooling apparatus.

Also, in some embodiments, the edge director cleaning apparatus 300 may further include a cooling apparatus 350 to prevent the nozzle pipes 310 from being overheated. Depictions (a), (b), and (c) of FIG. 6 are respectively a perspective view, a perspective view of a longitudinal cross-section, and a perspective view of a transverse cross-section of the cooling apparatus 350 according to embodiments. Referring to FIG. 6, (b) and (c) respectively illustrate cross-sections along plane B and plane C of the cooling apparatus 350. The cooling apparatus 350 may have a space through which a cooling medium may pass provided therein. Also, the cooling apparatus 350 may be configured to surround at least a portion of the nozzle pipes 310. The cooling medium may be, for example, water, but is not limited thereto.

Referring again to FIG. 4, the edge director cleaning apparatus 300 may include a monitoring window 370. The monitoring window 370 may be formed of a transparent material, e.g., glass, quartz, and the like. An operator may check an operating status of the nozzle tips 320 or the like through the monitoring window 370.

Figure 7:
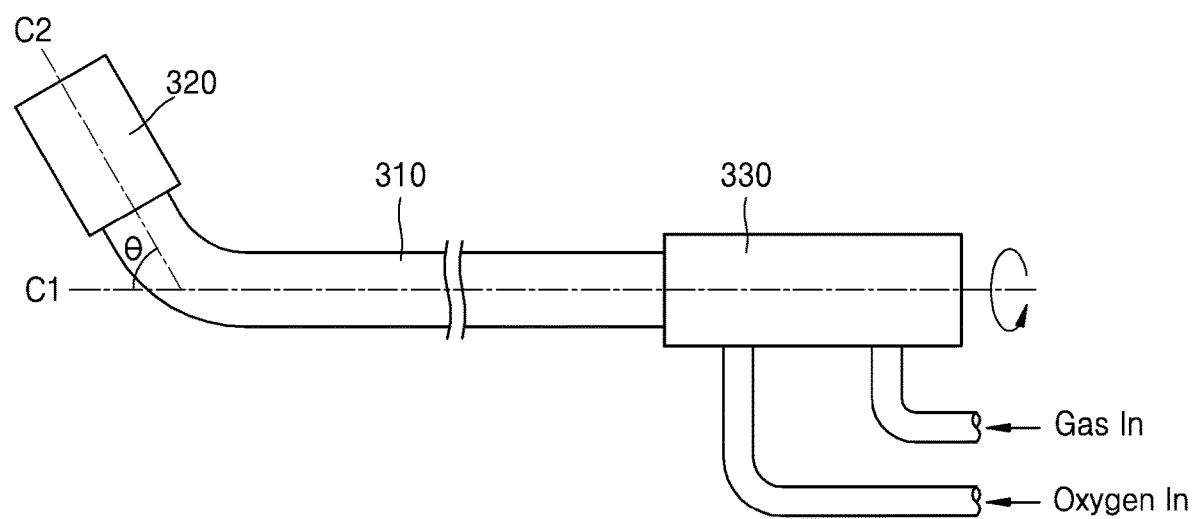
FIG. 7 is a lateral view illustrating a nozzle pipe and a nozzle tip in detail.

FIG. 7 is a lateral view illustrating the nozzle pipe 310 and the nozzle tip 320 in detail. Referring to FIG. 7, nozzle pipe 310 extends along a central axis, C1, and nozzle tip 320 extends along a central axis, C2, wherein C1 and C2 may be oblique to each other and form an angle θ therebetween. Here, the angle θ may, for example, be about 60° to about 75°. Alternatively, the angle θ may be about 65° to about 70°.

Also, the nozzle pipe 310 may be configured to be rotatable with respect to the central axis C1. In some embodiments, the nozzle pipe 310 may be configured to be rotatable by about 3° to about 30° or about 3° to about 15° with respect to the central axis C1. By rotating the nozzle pipe 310 about the central axis C1, a direction that the nozzle tip 320 extends may be changed.

Figure 8:
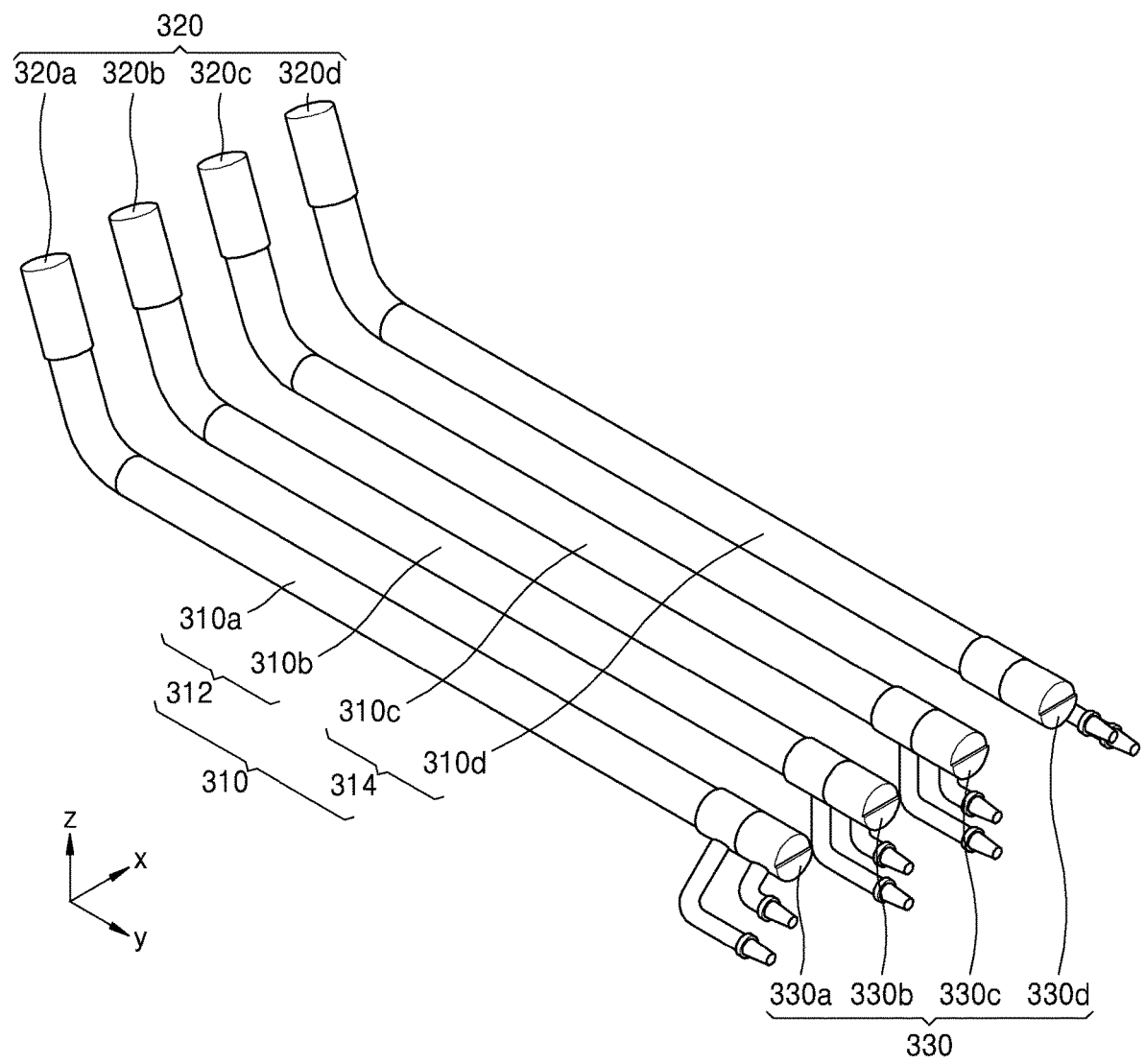
FIG. 8 is a perspective view illustrating configurations of a nozzle pipe and a nozzle tip of an edge director cleaning apparatus having four nozzle pipes.

FIG. 8 is a perspective view illustrating configurations of the nozzle pipe 310 and the nozzle tip 320 of the edge director cleaning apparatus 300 comprising four of the nozzle pipes 310.

Referring to FIG. 8, the nozzle pipes 310 may include a first nozzle pipe 310a, a second nozzle pipe 310b, a third nozzle pipe 310c, and a fourth nozzle pipe 310d which are sequentially arranged. The first nozzle pipe 310a and the second nozzle pipe 310b may be next to each other and form a first nozzle group 312. The third nozzle pipe 310c and the fourth nozzle pipe 310d may be next to each other and form a second nozzle group 314.

A first nozzle tip 320a, a second nozzle tip 320b, a third nozzle tip 320c, and a fourth nozzle tip 320d may be respectively provided at one end of the first nozzle pipe 310a, the second nozzle pipe 310b, the third nozzle pipe 310c, and the fourth nozzle pipe 310d. A first fuel manifold 330a, a second fuel manifold 330b, a third fuel manifold 330c, and a fourth fuel manifold 330d may be respectively provided at the other ends of the first nozzle pipe 310a, the second nozzle pipe 310b, the third nozzle pipe 310c, and the fourth nozzle pipe 310d.

Referring to FIGS. 2 and 8, as described above, the edge director cleaning apparatus 300 is inserted into the upper portions or the lower portions of the edge rollers 145a or the positions of the edge rollers 145a to remove devit. Here, the first nozzle group 312 may be inserted into the FDM on one side of the draw plane 215, and the second nozzle group 314 may be inserted into the FDM on the other side of the draw plane 215. The second nozzle group 314 may target the edge director 217 at the forming surface portion 207 of FIG. 2. The first nozzle group 312 may target an edge director at the forming surface portion 209 of FIG. 2 (the edge director is disposed at a side that is not visible in FIG. 2).

In some embodiments, the edge director 217 at the forming surface portion 207 and the edge director at the forming surface portion 209 may be symmetrical to each other with respect to the draw plane 215. In this case, the first nozzle group 312 and the second nozzle group 314 may have configurations symmetrical to each other with respect to the draw plane 215. In other words, directions that the nozzle tips 320a and 320b of the first nozzle group 312 extend and directions that the nozzle tips 320c and 320d of the second nozzle group 314 extend may be mirror-symmetric to each other with respect to the draw plane 215. More specifically, the directions that the first nozzle tip 320a and the fourth nozzle tip 320d extend may be mirror-symmetric to each other with respect to the draw plane 215. Also, the directions that the second nozzle tip 320b and the third nozzle tip 320c extend may be mirror-symmetric to each other with respect to the draw plane 215.

Figure 9:
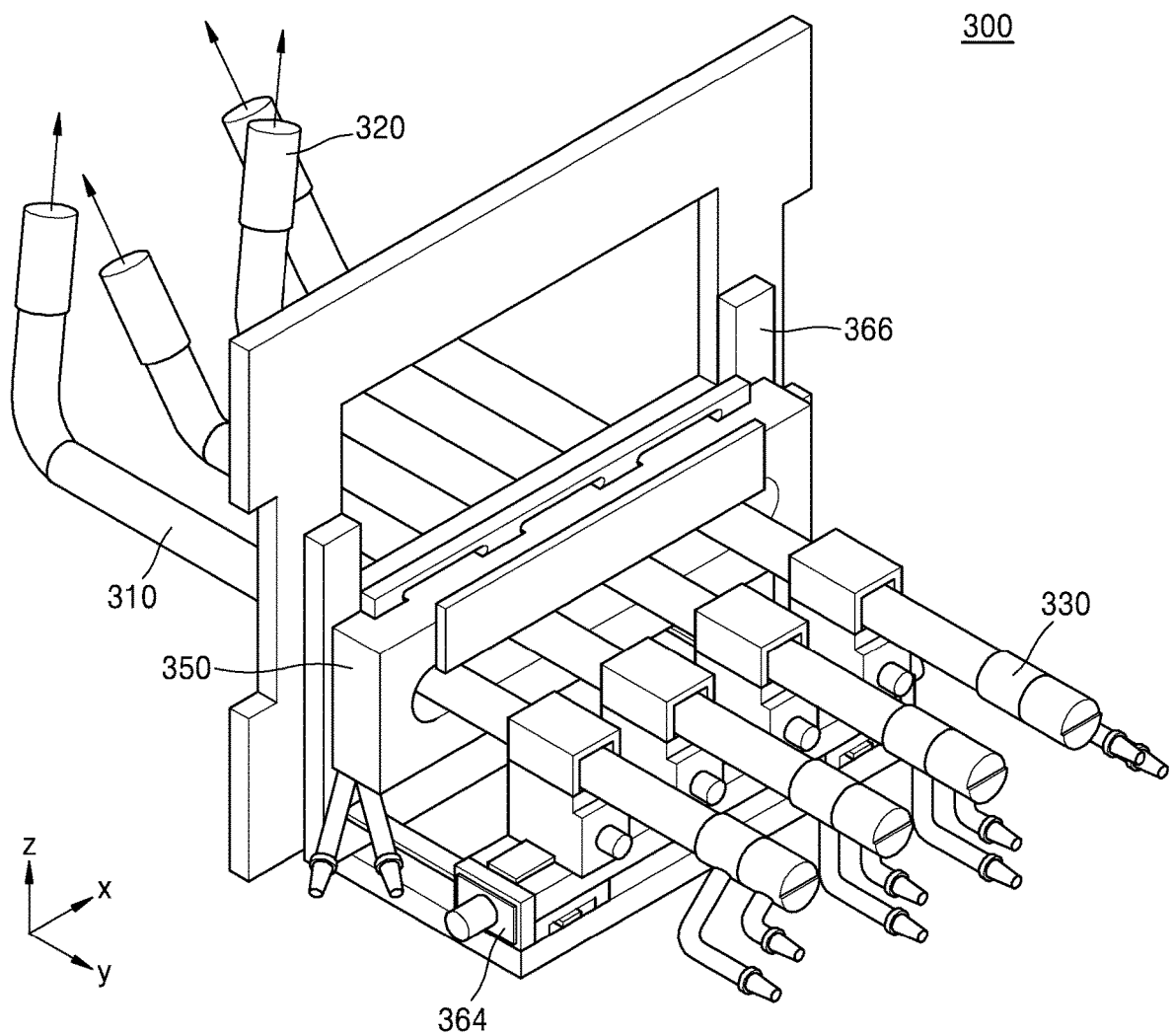
FIG. 9 is a perspective view illustrating an operational state of an edge director cleaning apparatus according to an embodiment.
Figure 10:
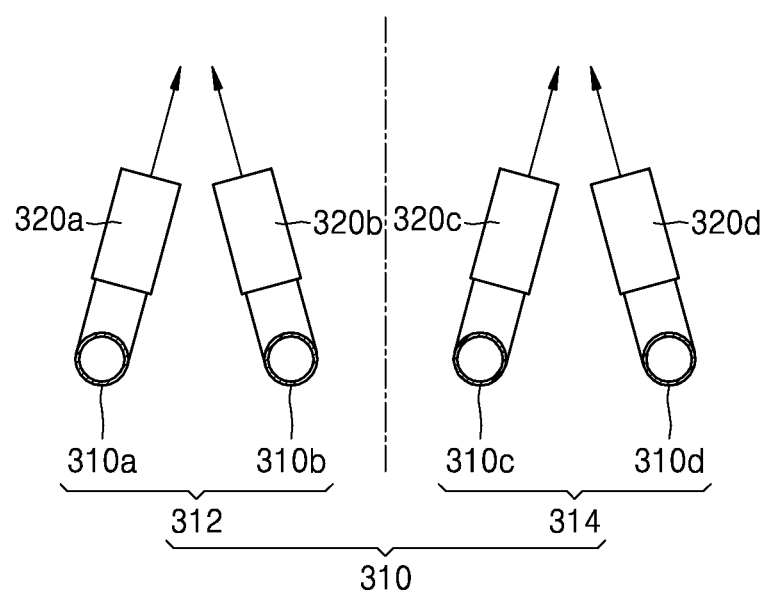
FIG. 10 is a schematic view of the edge director cleaning apparatus of FIG. 9 in a y-direction.

FIG. 9 is a perspective view illustrating an operational state of the edge director cleaning apparatus 300 according to embodiments. FIG. 10 is a mimetic view of the edge director cleaning apparatus 300 of FIG. 9 in the y-direction.

Referring to FIGS. 9 and 10, an extension direction of the first nozzle tip 320a and an extension direction of the second nozzle tip 320b may be configured to intersect each other. Also, an extension direction of the third nozzle tip 320c and an extension direction of the fourth nozzle tip 320d may be configured to intersect each other.

As mentioned above, the first nozzle tip 320a and the second nozzle tip 320b are arranged at one side of the draw plane 215, and the third nozzle tip 320c and the fourth nozzle tip 320d are arranged at the other side of the draw plane 215. The first nozzle tip 320a and the second nozzle tip 320b may be used to clean the edge director arranged at the one side of the draw plane 215. The third nozzle tip 320c and the fourth nozzle tip 320d may be used to clean the edge director arranged at the other side of the draw plane 215.

Although the extension direction of the first nozzle tip 320a and the extension direction of the second nozzle tip 320b are configured to intersect each other in FIGS. 9 and 10, the extension direction of the first nozzle tip 320a and the extension direction of the second nozzle tip 320b may also be configured to be parallel to each other. In some embodiments, the extension directions of the first nozzle tip 320a and the second nozzle tip 320b may be set so that flames released from the first nozzle tip 320a and flames released from the second nozzle tip 320b do not meet each other. Likewise, the extension direction of the third nozzle tip 320c and the extension direction of the fourth nozzle tip 320d may also be configured to be parallel to each other. In some embodiments, the extension directions of the third nozzle tip 320c and the fourth nozzle tip 320d may be set so that flames released from the third nozzle tip 320c and flames released from the fourth nozzle tip 320d do not meet each other.

In some embodiments, the extension directions of the nozzle tips 320 may be arranged as illustrated in FIGS. 9 and 10 to remove devit on the second surface 222 illustrated in FIG. 3. First, the extension directions of the first nozzle tip 320a and the fourth nozzle tip 320d may be arranged to remove the devit on the second surface 222 of a corresponding edge director. For example, the extension directions of the first nozzle tip 320a and the fourth nozzle tip 320d may be arranged so that the first nozzle tip 320a and the fourth nozzle tip 320d target an edge of the devit on the second surface 222 rather than being directed at the second surface 222 of the corresponding edge director.

Also, the second nozzle tip 320b and the third nozzle tip 320c may not directly target a corresponding edge director. In some embodiments, the second nozzle tip 320b and the third nozzle tip 320c may have directions for guiding molten glass to prevent the molten glass from falling directly on the first nozzle tip 320a and the fourth nozzle tip 320d. That is, the second nozzle tip 320b and the third nozzle tip 320c may guide molten glass falling from above due to gravity and enable the second surfaces 222 to be exposed. Also, the molten glass may be prevented from falling on the first nozzle tip 320a and the fourth nozzle tip 320d by the guiding. Also, the first nozzle tip 320a and the fourth nozzle tip 320d may have extension directions that enable the devit on the second surfaces 222 to be removed.

The extension direction of each of the nozzle tips 320a, 320b, 320c, and 320d illustrated in FIG. 10 may be properly adjusted in real time as the devit is removed. That is, the extension direction of each of the nozzle tips 320a, 320b, 320c, and 320d may be adjusted by properly rotating the nozzle pipes 310a, 310b, 310c, and 310 to which the nozzle tips 320a, 320b, 320c, and 320d are respectively attached with respect to the respective central axes.

Figure 11:
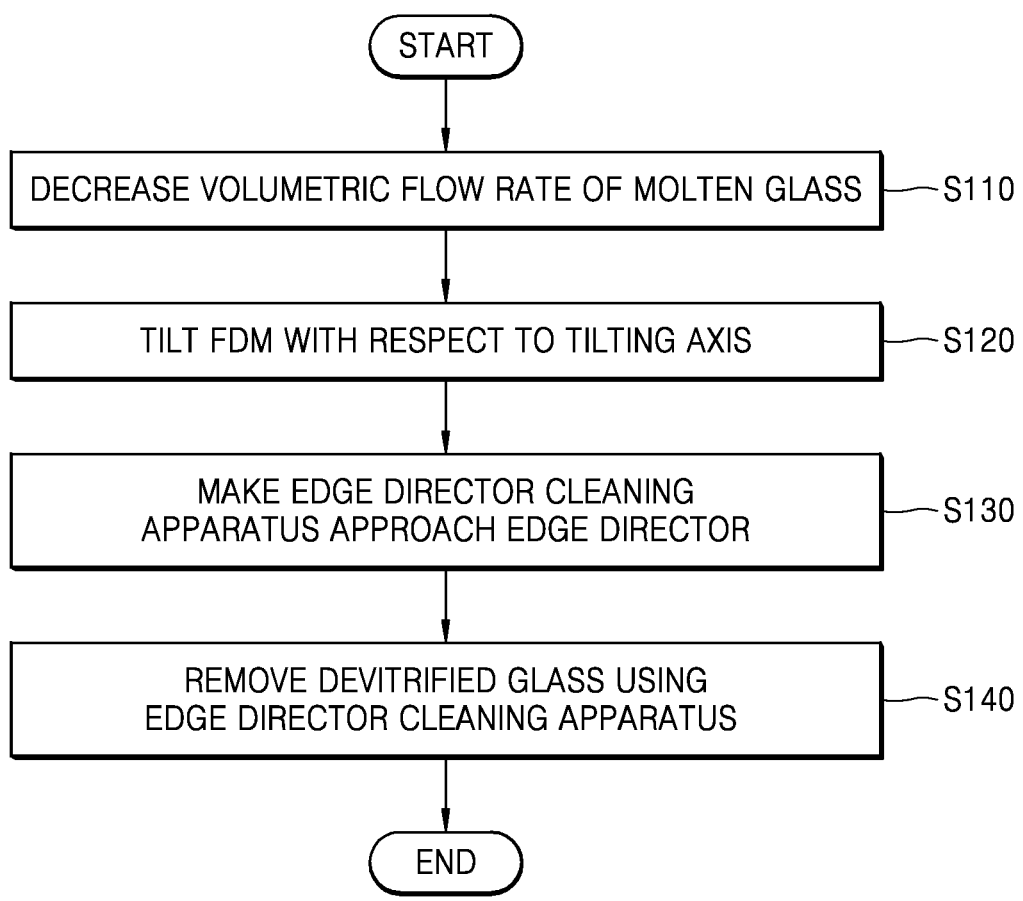
FIG. 11 is a flowchart illustrating an edge director cleaning method according to an embodiment.

FIG. 11 is a flowchart sequentially illustrating edge director cleaning according to embodiments. FIGS. 12A to 12E are conceptual views sequentially illustrating an edge director cleaning method according to embodiments.

Figure 12A:
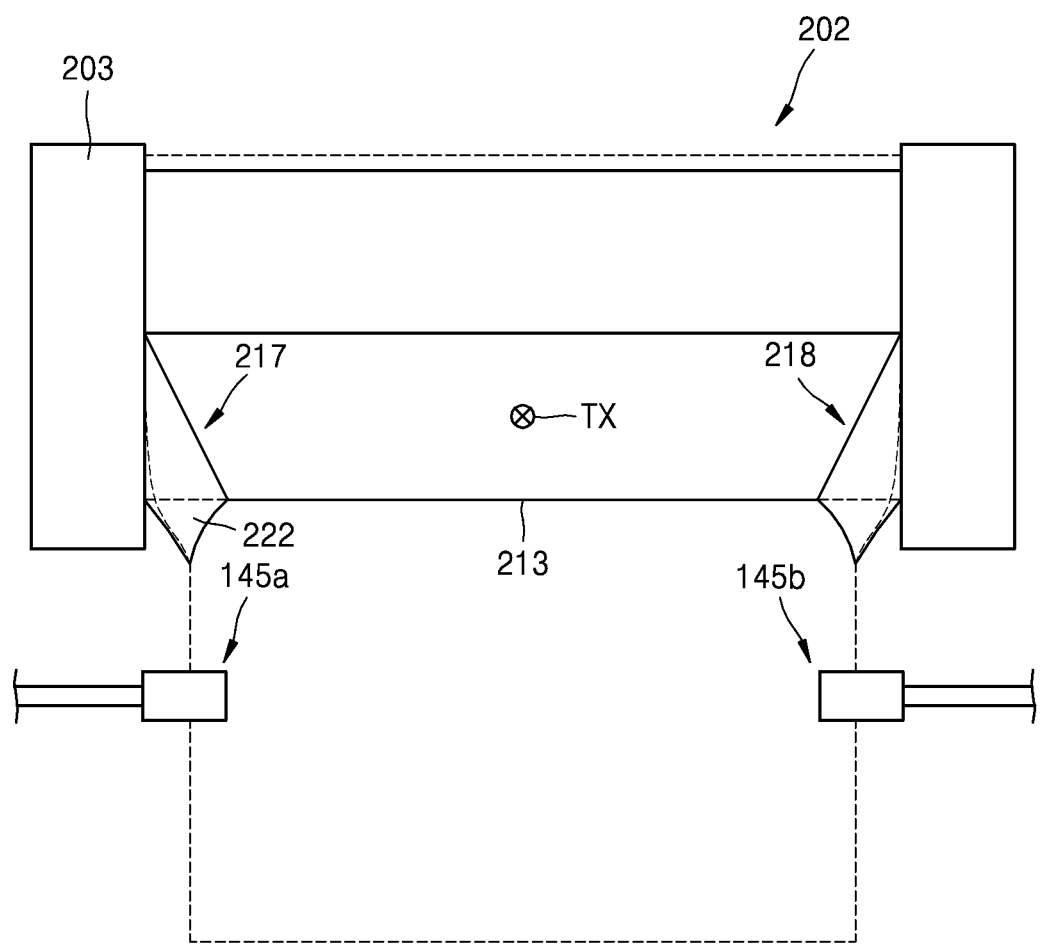
FIGS. 12A to 12E are conceptual views illustrating an edge director cleaning method according to an embodiment.

Referring to FIGS. 11 and 12A, first, a volumetric flow rate of molten glass being supplied to the forming apparatus 202 fusion drawing machine 143 may be decreased (S110)

to facilitate a devit removing task. In some embodiments, the volumetric flow rate of the molten glass may be decreased by about 5 volume % to about 20 volume % compared to a normal manufacturing state. In other words, the decreased volumetric flow rate of the molten glass may be about 80 volume % to about 95 volume % compared to the normal manufacturing state.

When the devit removing task is performed while the molten glass is not being supplied, there is a concern of ribbon cracking due to thermal contraction caused by an excessive decrease in a temperature of the forming apparatus 202 fusion drawing machine 143. Consequently, a volumetric flow rate at which an influence on the devit removing task is small as possible even while the molten glass is being supplied may be selected. Consequently, the molten glass may continuously overflow from both sides of the fusion drawing machine, i.e., surfaces of both of the forming surface portions 207 and 209, while the devit removing task is being performed. However, it may be difficult to manufacture a normal product while the devit removing task is being performed.

Figure 12B:
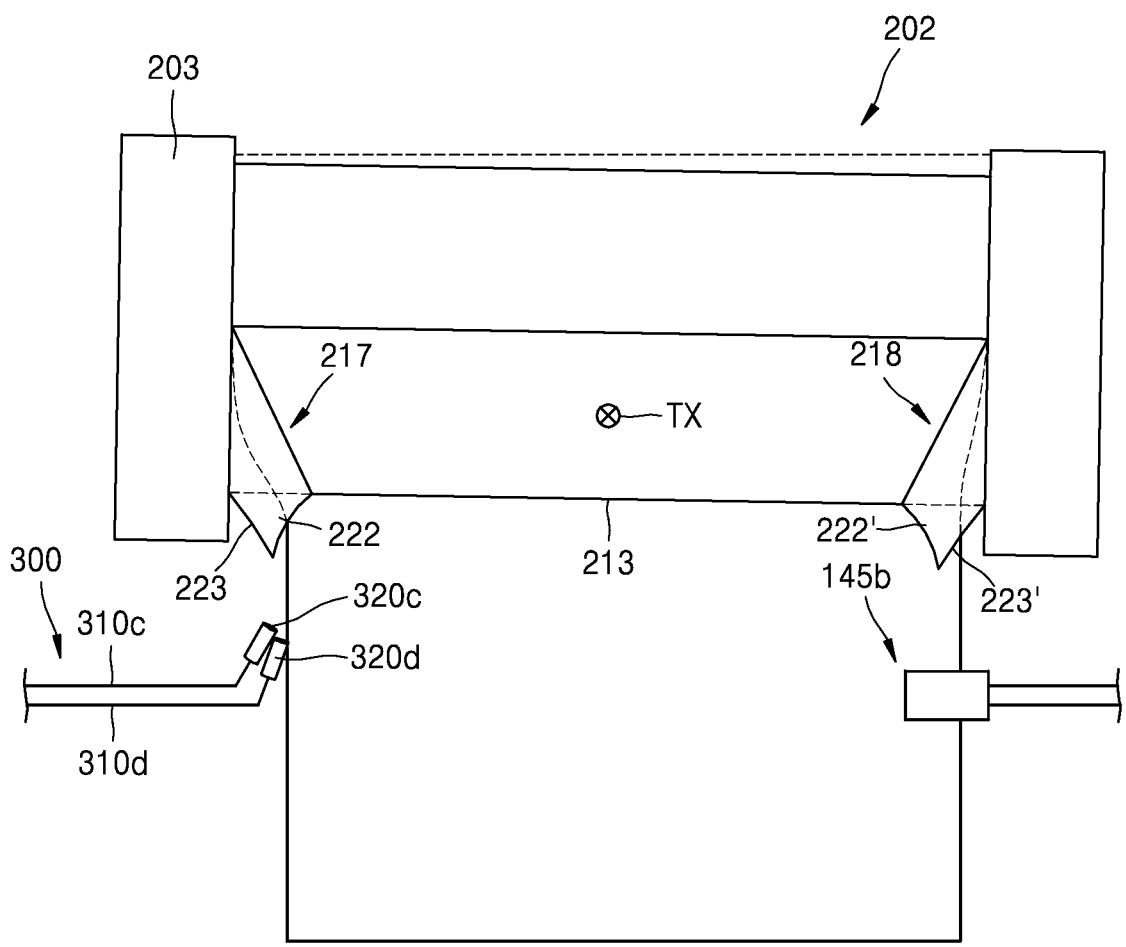

Referring to FIGS. 11 and 12B, the forming apparatus 202 fusion drawing machine 143 may be tilted about a tilting axis TX (S120). In FIG. 12B, it can be seen that the forming apparatus 202 fusion drawing machine 143 is tilted clockwise about the tilting axis TX. As a result, it can be seen that a liquid level of the molten glass is not constant on an upper surface of the forming wedge 201. That is, a liquid level of the molten glass on the right may be higher than the liquid level of the molten glass on the left in FIG. 12B. This may signify that, in the forming apparatus 202 fusion drawing machine 143, an edge director 218 is at a lower position in comparison to its position before the tilting. Further, this may signify that the amount of molten glass flowing toward the edge director 217 is smaller than the amount of molten glass flowing toward the edge director 218. Thus, a task of removing devit attached to a surface of the edge director 217 may be performed prior to removing devit attached to a surface of the edge director 218 first.

An angle at which the forming apparatus 202 fusion drawing machine 143 is tilted about the tilting axis TX may, for example, be about 0.1° to about 0.5°, such as about 0.2° to about 0.3°.

For this, the edge director cleaning apparatus 300 may be made to approach the edge director 217. Although the edge director cleaning apparatus 300 is illustrated as being provided as a substitute for the edge rollers 145a here, the present disclosure is not limited thereto.

Particularly, the edge director cleaning apparatus 300 is illustrated as having approached the edge director 217 to clean the second surface 222 of the edge director 217 here. Also, the directions that the third nozzle tip 320c and the fourth nozzle tip 320d extend may be adjusted to intersect each other to clean the second surface 222. This is the same as the description given above with reference to FIGS. 9 and 10. The devit on the second surface 222 may be totally or mostly removed by releasing flames through the third nozzle tip 320c and the fourth nozzle tip 320d.

Figure 12C:
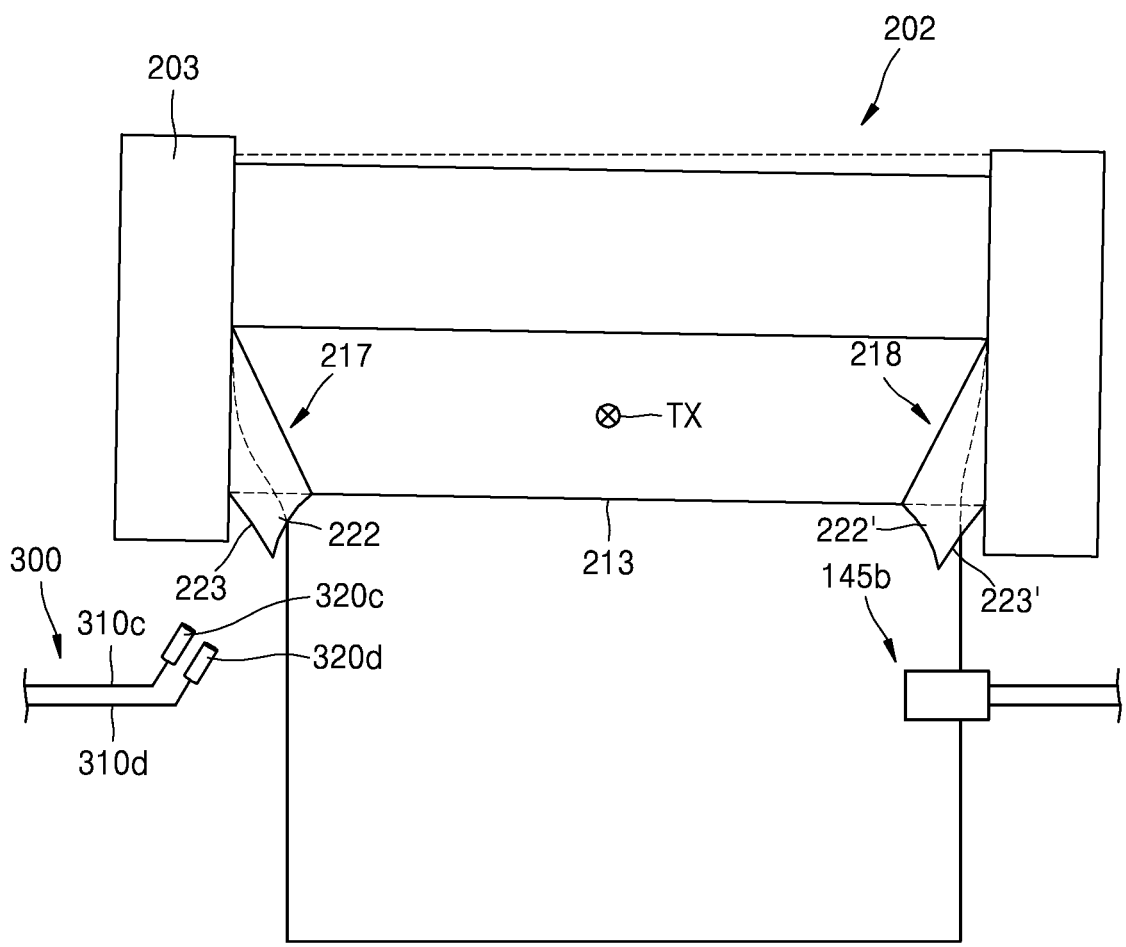

Referring to FIG. 12C, insertion depths and the extension directions of the third nozzle tip 320c and the fourth nozzle tip 320d may be adjusted to remove devit on the third surface 223. The third nozzle pipe 310c and the fourth nozzle pipe 310d may be moved in a longitudinal direction of the forming apparatus 202 fusion drawing machine 143 (a horizontal direction in FIG. 12C) to adjust the insertion depths of the third nozzle tip 320c and the fourth nozzle tip 320d. Also, the third nozzle pipe 310c and the fourth nozzle pipe 310d may be rotated by a certain angle about the central axes thereof to adjust the extension directions of the third nozzle tip 320c and the fourth nozzle tip 320d. The insertion depths and rotation angles of the third nozzle pipe 310c and the fourth nozzle pipe 310d may be determined independently from each other. Also, the insertion depths and the rotation angles of the third nozzle pipe 310c and the fourth nozzle pipe 310d may vary depending on specific shapes, sizes, and the like of the forming wedge 201 fusion drawing machine 143 and the edge director 217.

The extension directions of the third nozzle tip 320c and the fourth nozzle tip 320d for cleaning the third surface 223 may be substantially parallel to each other, but embodiments are not limited thereto.

Next, devit on a surface of the edge director 218 can be removed. For this, the forming apparatus 202 fusion drawing machine 143 may be tilted counterclockwise about the tilting axis TX so that the forming apparatus 202 fusion drawing machine 143 is tilted in a direction opposite to that in FIG. 12B.

Figure 12D:
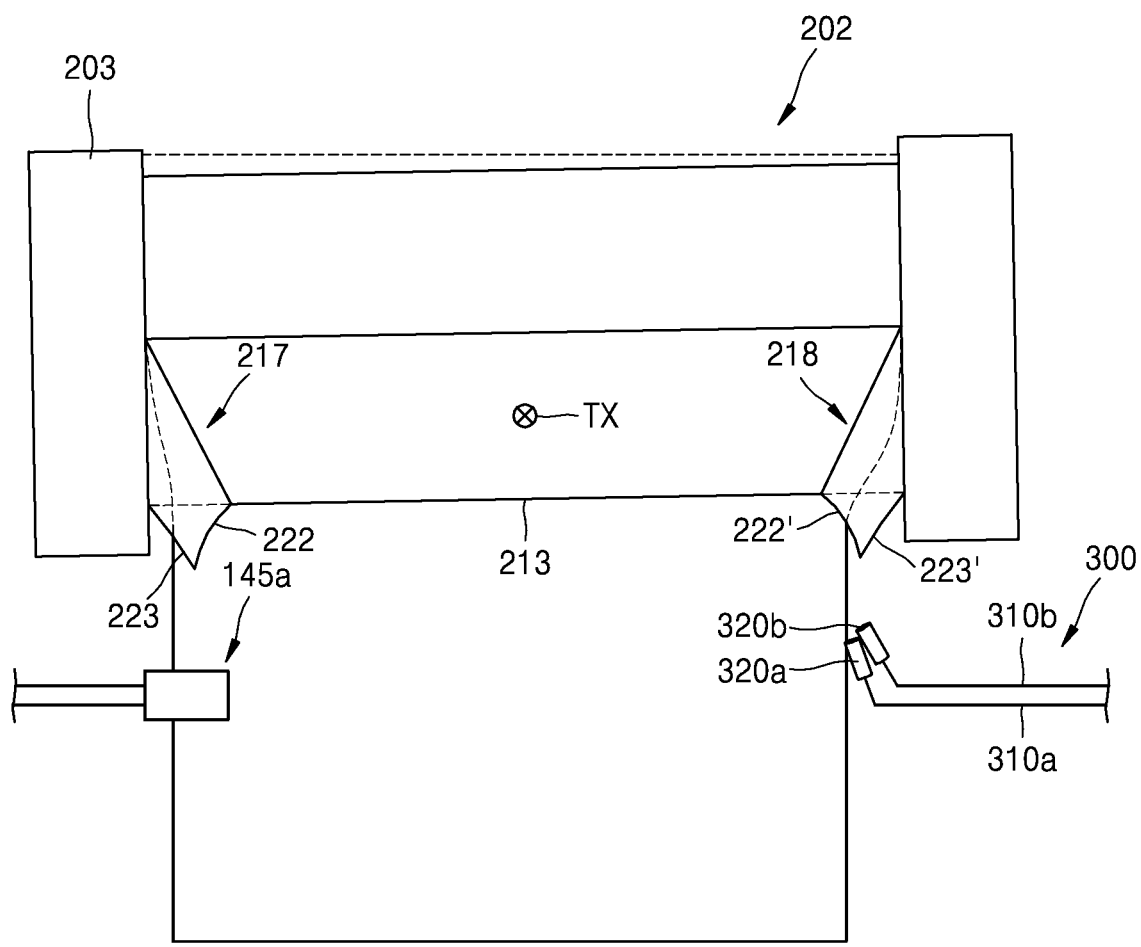

Referring to FIG. 12D, the liquid level of the molten glass at the left may be higher than the liquid level of the molten glass at the right. This may signify that, in the forming apparatus 202 fusion drawing machine 143, the edge director 217 is at a lower position in comparison to its position before the tilting. Further, this may signify that the amount of molten glass flowing toward the edge director 218 is smaller than the amount of molten glass flowing toward the edge director 217. Thus, a task of removing devit attached to surface of the edge director 218 may be performed.

For this, the edge director cleaning apparatus 300 may be made to approach the edge director 218. Although the edge director cleaning apparatus 300 is illustrated as being provided as a substitute for the edge rollers 145a here, the present disclosure is not limited thereto.

Particularly, the edge director cleaning apparatus 300 is illustrated as having approached the edge director 218 to clean a second surface 222' of the edge director 218 here. Also, the directions that the first nozzle tip 320a and the second nozzle tip 320b extend may be adjusted to intersect each other to clean the second surface 222'. This is the same as the description given above with reference to FIGS. 9 and 10. Devit on the second surface 222' may be totally or mostly removed by releasing flames through the first nozzle tip 320a and the second nozzle tip 320b.

Figure 12E:
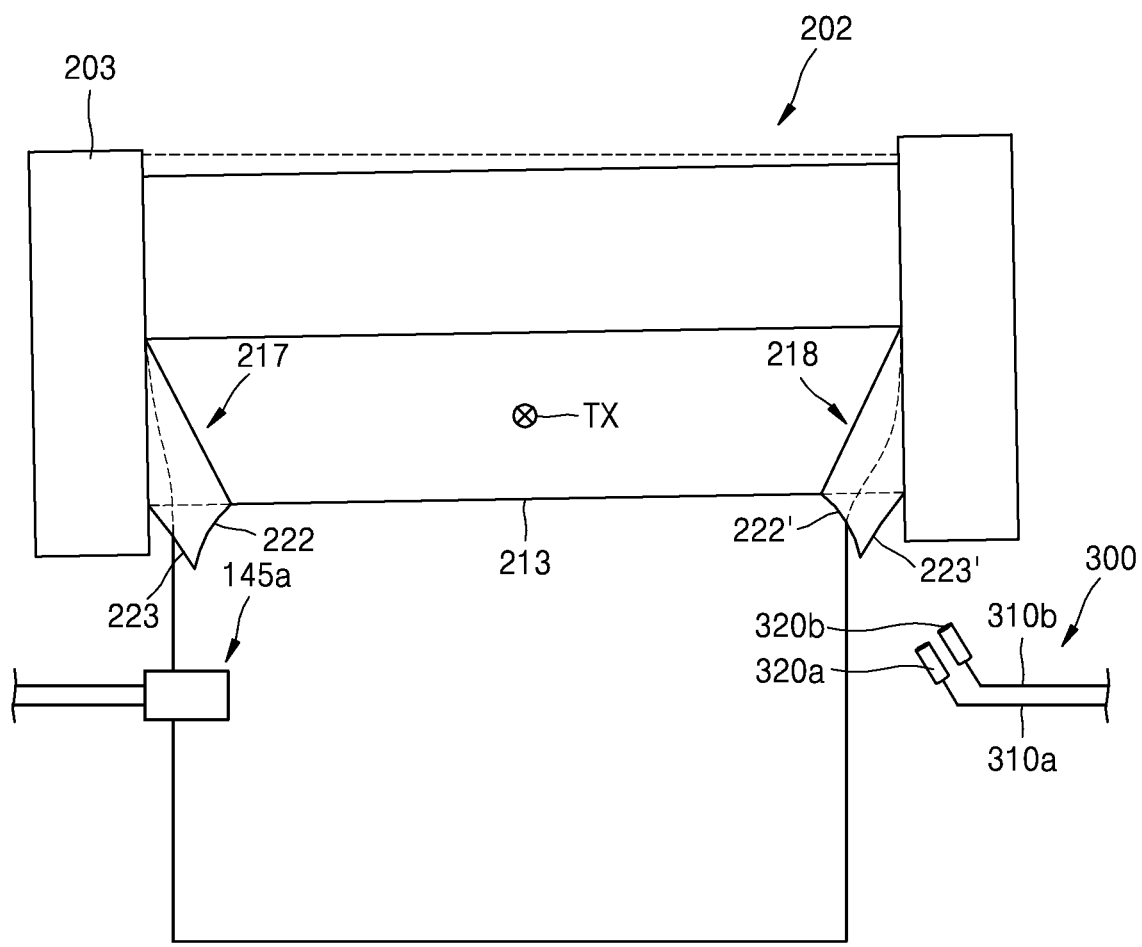

Referring to FIG. 12E, insertion depths and the extension directions of the first nozzle tip 320a and the second nozzle tip 320b may be adjusted to remove devit on a third surface 223'. The first nozzle pipe 310a and the second nozzle pipe 310b may be moved in the longitudinal direction of the forming apparatus 202 fusion drawing machine 143 (a horizontal direction in FIG. 12E) to adjust the insertion depths of the first nozzle tip 320a and the second nozzle tip 320b. Also, the first nozzle pipe 310a and the second nozzle pipe 310b may be rotated by a certain angle about the central axes thereof to adjust the extension directions of the first nozzle tip 320a and the second nozzle tip 320b. The insertion depths and rotation angles of the first nozzle pipe 310a and the second nozzle pipe 310b may be determined independently from each other. Also, the insertion depths and the rotation angles of the first nozzle pipe 310a and the second nozzle pipe 310b may vary depending on specific shapes, sizes, and the like of the forming wedge 201 fusion drawing machine 143 and the edge director 218.

The extension directions of the first nozzle tip 320a and the second nozzle tip 320b for cleaning the third surface 223' may be substantially parallel to each other, but embodiments are not limited thereto.

When the cleaning of the third surface 223' is finished, a process of returning to normal operation may be performed. Specifically, the forming apparatus 202 fusion drawing machine 143 is returned to its original position (e.g., not tilted), and the volumetric flow rate of the molten glass is restored to its original value. Then, the returning to the normal operation may take place by adjusting other process conditions.

Embodiments of the present disclosure have been described in detail as above. However, those of ordinary skill in the art to which the present disclosure pertains should be able to modify and practice the present disclosure in various ways without departing from the spirit and scope of the present disclosure defined by the following claims. Consequently, future modifications of the embodiments of the present disclosure do not be able to depart from the technology of the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An edge director cleaning apparatus comprising:
a first nozzle pipe comprising a first nozzle tip positioned at a first end of the first nozzle pipe, the first nozzle tip configured to dispense a first flame in a first flame direction of a first flame axis, wherein the first flame direction is configured to extend toward and intersect a first side of a fusion draw plane outwardly spaced from the first nozzle tip;
a second nozzle pipe comprising a second nozzle tip positioned at a first end of the second nozzle pipe, the second nozzle tip configured to dispense a second flame in a second flame direction of a second flame axis, wherein the second flame direction is configured to extend toward and intersect the first side of the fusion draw plane; and
the first flame direction and the second flame direction converge and intersect.

2. The edge director cleaning apparatus of claim 1, wherein the first flame axis does not intersect the second flame axis.

3. The edge director cleaning apparatus of claim 1, wherein a fuel manifold is connected to a second end of the first nozzle pipe.

4. The edge director cleaning apparatus of claim 1, further comprising a fixing guide configured to fix a position of the first nozzle pipe relative to the second nozzle pipe.

5. The edge director cleaning apparatus of claim 1, wherein the first nozzle pipe is configured to rotate about a first rotation axis.

6. The edge director cleaning apparatus of claim 5, wherein the first nozzle pipe is configured to rotate from 3° to 15° about the first rotation axis.

7. The edge director cleaning apparatus of claim 5, wherein the first flame direction extends at an oblique angle relative to the first rotation axis.

8. The edge director cleaning apparatus of claim 7, wherein the oblique angle is within a range of 60° to 75°.

9. The edge director cleaning apparatus of claim 1, further comprising a cooling apparatus at least partially surrounding the first nozzle pipe and the second nozzle pipe.

10. The edge director cleaning apparatus of claim 9, wherein the cooling apparatus entirely surrounds the first nozzle pipe and the second nozzle pipe.

11. The edge director cleaning apparatus of claim 1, further comprising:
a third nozzle pipe comprising a third nozzle tip positioned at a first end of a third nozzle pipe, the third nozzle tip configured to dispense a third flame in a third flame direction of a third flame axis, wherein the third flame direction is configured to extend toward and intersect a second side of the fusion draw plane that is outwardly spaced from the third nozzle tip;
a fourth nozzle pipe comprising a fourth nozzle tip positioned at a first end of the fourth nozzle pipe, the fourth nozzle tip configured to dispense a fourth flame in a fourth flame direction of a fourth flame axis, wherein the fourth flame direction is configured to extend toward and intersect the second side of the fusion draw plane; and
the third flame direction and the fourth flame direction converge and intersect.

12. The edge director cleaning apparatus of claim 11, wherein the fourth nozzle tip is configured to extend as a mirror image of the first nozzle tip about the fusion draw plane, and the third nozzle tip is configured to extend as a mirror image of the second nozzle tip about the fusion draw plane.

13. The edge director cleaning apparatus of claim 11, wherein the third flame axis does not intersect the fourth flame axis.

14. A method of cleaning an edge director of forming apparatus of a fusion drawing machine with the edge director cleaning apparatus of claim 11, the method comprising:
drawing a sheet of molten glass from the forming apparatus along a fusion draw plane;
removing a first devit on a first surface of the edge director by dispensing a first flame from the first nozzle tip;
guiding molten glass from falling on the first nozzle tip by dispensing a second flame from the second nozzle tip;
removing a second devit on a second surface of the edge director by dispensing a fourth flame from the fourth nozzle tip; and
guiding molten glass from falling on the fourth nozzle tip by dispensing a third flame from the third nozzle tip.

15. A method of cleaning an edge director of a forming apparatus of a fusion drawing machine with the edge director cleaning apparatus of claim 1, the method comprising:
drawing a sheet of molten glass from the forming apparatus along a fusion draw plane;
removing a devit on a surface of the edge director by dispensing a first flame from the first nozzle tip; and
guiding molten glass from falling on the first nozzle tip by dispensing a second flame from the second nozzle tip.

16. The method of claim 15, wherein the first flame axis does not intersect the second flame axis.

17. The method of claim 15, further comprising, before removing the devit, reducing an amount of molten glass flowing toward the edge director by tilting the forming apparatus with respect to a tilting axis that is perpendicular to the fusion draw plane while drawing the sheet of molten glass from the forming apparatus.

18. The method of claim 17, wherein the forming apparatus is tilted within a range from 0.1° to 0.5° about the tilting axis.

19. The method of claim 15, further comprising reducing a volumetric flow rate of molten glass being supplied to the forming apparatus within a range from 5 volume % to 20 volume % before removing the devit.

20. The method of claim 15, further comprising removing edge rollers from a location of the fusion drawing machine, and then installing the edge director cleaning apparatus at the location prior to removing the devit.

* * * * *

UNITED STATES PATENT AND TRADEMARK OFFICE
CERTIFICATE OF CORRECTION

| | |
|---|---|
| PATENT NO. | : 11,738,375 B2 |
| APPLICATION NO. | : 16/489498 |
| DATED | : August 29, 2023 |
| INVENTOR(S) | : Jeehun Kim et al. |

It is certified that error appears in the above-identified patent and that said Letters Patent is hereby corrected as shown below:

On the Title Page

On the page 2, in Column 2, under item (56) "Foreign Patent Documents", Line 13, delete "I447078" and insert -- 1447078 --.

In the Specification

In Column 1, Line 7, after "U.S.C." insert -- § --.

Signed and Sealed this
Second Day of January, 2024

Katherine Kelly Vidal
*Director of the United States Patent and Trademark Office*